US011463136B2

(12) United States Patent
Sakai

(10) Patent No.: US 11,463,136 B2
(45) Date of Patent: Oct. 4, 2022

(54) TRANSMISSION DEVICE, TRANSMISSION METHOD, RECEPTION DEVICE, AND RECEPTION METHOD

(71) Applicant: Sony Group Corporation, Tokyo (JP)

(72) Inventor: Lui Sakai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/294,852

(22) PCT Filed: Nov. 26, 2019

(86) PCT No.: PCT/JP2019/046054
§ 371 (c)(1),
(2) Date: May 18, 2021

(87) PCT Pub. No.: WO2020/121798
PCT Pub. Date: Jun. 18, 2020

(65) Prior Publication Data
US 2022/0029666 A1    Jan. 27, 2022

(30) Foreign Application Priority Data
Dec. 10, 2018 (JP) .............................. JP2018-230975

(51) Int. Cl.
*H04B 7/0413* (2017.01)
*H04L 27/26* (2006.01)
(Continued)

(52) U.S. Cl.
CPC ....... *H04B 7/0413* (2013.01); *H04L 27/2601* (2013.01); *H04N 21/2665* (2013.01); *H04N 21/4382* (2013.01); *H04N 21/6112* (2013.01)

(58) Field of Classification Search
CPC .... H04N 21/2665; H04H 20/08; H04H 40/18; H04L 27/2601; H03J 1/0083; H04B 7/0413
See application file for complete search history.

(56) References Cited

U.S. PATENT DOCUMENTS 5,757,441 A * 5/1998 Lee ..................... H03J 1/0083
                                                348/731
2003/0017811 A1* 1/2003 Hoshi ................. H04B 7/0814
                                                455/101
(Continued)

FOREIGN PATENT DOCUMENTS

JP    2005-260342 A    9/2005
JP    2017-192052 A    10/2017
(Continued)

OTHER PUBLICATIONS

International Search Report dated Feb. 10, 2020 in PCT/JP2019/046054 filed Nov. 26, 2019, therein 3 pages
(Continued)

*Primary Examiner* — Khanh C Tran
(74) *Attorney, Agent, or Firm* — Oblon, McClelland, Maier & Neustadt, L.L.P.

(57) ABSTRACT

The present technology relates to a transmission device, a transmission method, a reception device, and a reception method that make it possible to more reliably transmit a transmission control signal.
Provided is a transmission device including a transmission unit that includes a first transmission control signal compatible with a first system in a first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna. The present technology can be applied to, for example, a transmission system compatible with a broadcast system such as an ISDB-T system.

20 Claims, 10 Drawing Sheets

(51) Int. Cl.
  *H04N 21/2665* (2011.01)
  *H04N 21/438* (2011.01)
  *H04N 21/61* (2011.01)

(56) References Cited

U.S. PATENT DOCUMENTS

| | | | |
|---|---|---|---|
| 2016/0337012 A1 | 11/2016 | Kimura et al. | |
| 2018/0270539 A1* | 9/2018 | Kim | H04N 21/8456 |
| 2019/0158199 A1* | 5/2019 | Takahashi | H04H 20/33 |
| 2019/0166409 A1* | 5/2019 | Takahashi | H04H 60/13 |

FOREIGN PATENT DOCUMENTS

| | | |
|---|---|---|
| JP | 2019-12876 A | 1/2019 |
| JP | 2019-201404 A | 11/2019 |
| WO | WO 2014/057924 A1 | 4/2014 |
| WO | WO 2015/045078 A1 | 4/2015 |
| WO | WO 2016/038954 A1 | 3/2016 |

OTHER PUBLICATIONS

"Study of Terrestrial Television Broadcasting Enhancement Technologies", Ministry of Internal Affairs and Communications Information and Communications Bureau, NHK, Kansai Telecasting Co. Ltd., Tokyo Broadcasting System Television, 2018, pp. 9-18.
Tsumochi, J., et al., "Development of millimeter-wave Link for 8K Super Hi-Vision Program Contribution", NHK Science & Technology research Laboratories, 2017, pp. 28-38.

* cited by examiner

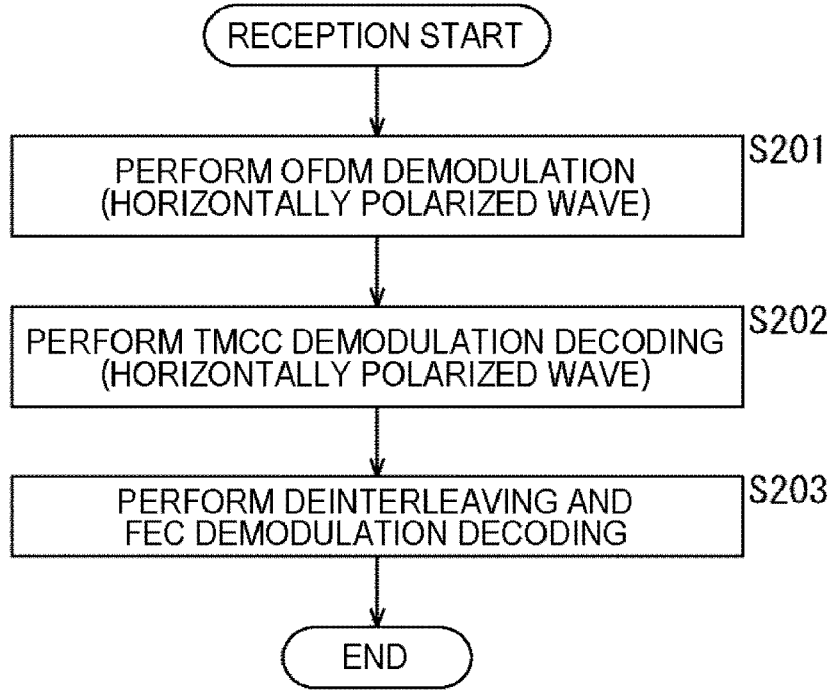
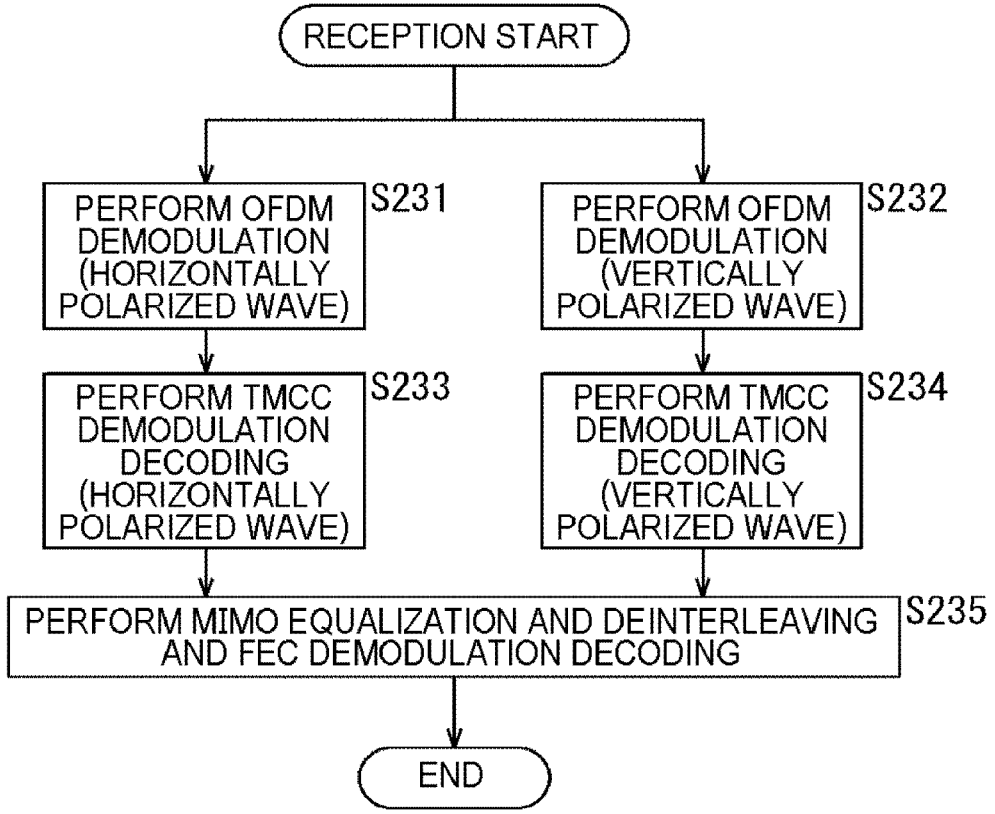

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly to a transmission device, a transmission method, a reception device, and a reception method enabled to more reliably transmit a transmission control signal.

BACKGROUND ART

For example, in Japan, studies have been conducted on sophistication of terrestrial digital television broadcasting toward the next generation, and various technical methods have been studied (see, for example, Patent Document 1).

CITATION LIST

Patent Document

Patent Document 1: Japanese Patent Application Laid-Open No. 2017-192052

SUMMARY OF THE INVENTION

Problems to be Solved by the Invention

By the way, when operation of a next-generation broadcast system is started, a period of transition from a current broadcast system to the next-generation broadcast system is provided, and in the period of transition, it is required to more reliably transmit a transmission control signal for each of a reception device compatible with the current system and a reception device compatible with the next-generation system.

The present technology has been made in view of such a situation, and makes it possible to more reliably transmit the transmission control signal.

Solutions to Problems

A transmission device of one aspect of the present technology is a transmission device including a transmission unit that includes a first transmission control signal compatible with a first system in a first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna.

A transmission method of one aspect of the present technology is a transmission method in which a transmission device includes a first transmission control signal compatible with a first system in a first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna.

In the transmission device and the transmission method of one aspect of the present technology, the first transmission control signal compatible with the first system is included in the first broadcast signal including the signal of the first content compatible with the first system and the signal of the second content compatible with the second system and is transmitted via the first transmission antenna, and the second transmission control signal compatible with the second system is included in the second broadcast signal including the signal of the second content and is transmitted via the second transmission antenna.

A reception device of one aspect of the present technology is a reception device including a reception unit that receives a first broadcast signal transmitted from a transmission device via a first reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including a signal of the second content and transmits the second broadcast signal via a second transmission antenna.

A reception method of one aspect of the present technology is a reception method in which a reception device enabled to receive a broadcast signal transmitted from a transmission device receives a first broadcast signal transmitted from the transmission device via a first reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna, and the reception device performs processing including demodulation and decoding of the signal of the first content included in the first broadcast signal received, on the basis of the first transmission control signal included in the first broadcast signal received.

Furthermore, a reception method of one aspect of the present technology is a reception method in which a reception device enabled to receive a broadcast signal transmitted from a transmission device receives a first broadcast signal transmitted from the transmission device via a first reception antenna and receives a second broadcast signal via a second reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in the second broadcast signal including the signal of the second content and transmits the second broadcast signal via a second transmission antenna, and the reception device performs processing including demodulation and decoding of the signal of the second content included in the first broadcast signal and the second broadcast signal received, on the basis of the second transmission control signal included in the second broadcast signal received.

In the reception device and the reception method of one aspect of the present technology, the first broadcast signal transmitted from the transmission device is received via the first reception antenna, the transmission device including a transmission unit that includes a first transmission control signal compatible with the first system in the first broadcast signal including a signal of a first content compatible with a first system and a signal of a second content compatible with a second system and transmits the first broadcast signal via the first transmission antenna, and includes a second transmission control signal compatible with the second system in a second broadcast signal including the signal of the second content and transmits the second broadcast signal via a second transmission antenna, and processing is performed including demodulation and decoding of the signal of the first content included in the first broadcast signal received, on the basis of the first transmission control signal included in the first broadcast signal received.

Furthermore, in the reception device and the reception method of one aspect of the present technology, the first broadcast signal transmitted from the transmission device is received via the first reception antenna and the second broadcast signal is received via the second reception antenna, the transmission device including a transmission unit that includes a first transmission control signal compatible with the first system in the first broadcast signal including a signal of a first content compatible with a first system and a signal of a second content compatible with a second system and transmits the first broadcast signal via the first transmission antenna, and includes a second transmission control signal compatible with the second system in a second broadcast signal including the signal of the second content and transmits the second broadcast signal via a second transmission antenna, and processing is performed including demodulation and decoding of the signal of the second content included in the first broadcast signal and the second broadcast signal received, on the basis of the second transmission control signal included in the second broadcast signal received.

Note that, the transmission device and the reception device of one aspect of the present technology may be an independent device or an internal block constituting one device.

BRIEF DESCRIPTION OF DRAWINGS

FIG. 9 is a flowchart illustrating a flow of reception processing compatible with a current system.

FIG. 10 is a flowchart illustrating a flow of reception processing compatible with a next-generation system.

MODE FOR CARRYING OUT THE INVENTION

Hereinafter, embodiments of the present technology will be described with reference to the drawings. Note that, the description will be given in the following order.
1. Embodiment of the present technology
2. Modifications
3. Configuration of computer 1. Embodiment of the Present Technology (Configuration Example of Transmission System)

Figure 1:
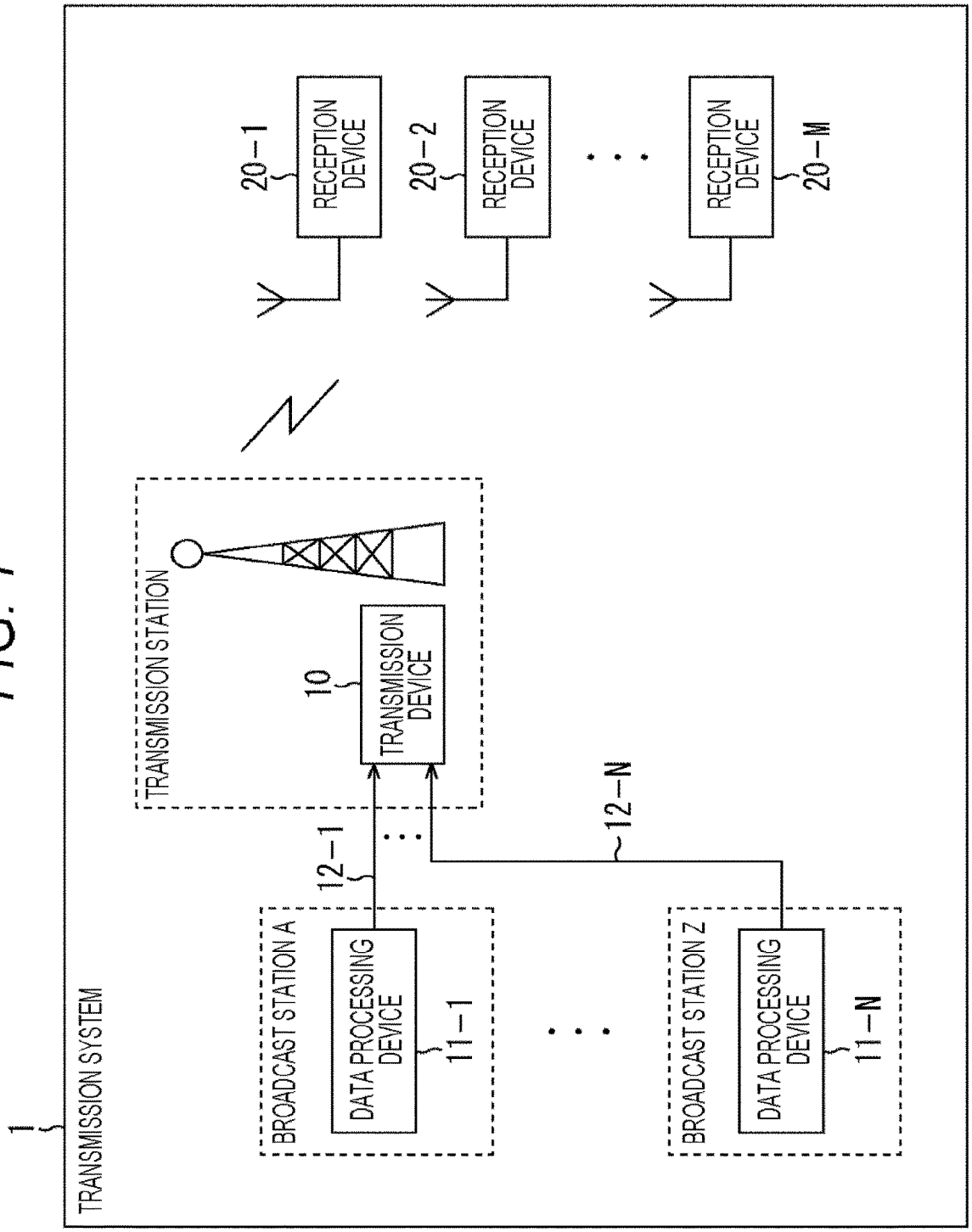
FIG. 1 is a diagram illustrating a configuration of an embodiment of a transmission system to which the present technology is applied.

FIG. 1 is a diagram illustrating a configuration of an embodiment of a transmission system to which the present technology is applied. Note that, a system is a logical aggregation of a plurality of devices.

In FIG. 1, a transmission system 1 is a system compatible with a broadcast system such as terrestrial digital television broadcasting. The transmission system 1 includes data processing devices 11-1 to 11-N (N is an integer greater than or equal to 1) installed in facilities related to respective broadcast stations, a transmission device 10 installed in a transmission station, and reception devices 20-1 to 20-M (M is an integer greater than or equal to 1) owned by respective users.

Furthermore, in the transmission system 1, the data processing devices 11-1 to 11-N and the transmission device 10 are connected to each other via communication lines 12-1 to 12-N. Note that, the communication lines 12-1 to 12-N can be dedicated lines, for example.

The data processing device 11-1 performs necessary processing such as encoding on data of a broadcast content (for example, a broadcast program) produced by a broadcast station A, and transmits transmission data obtained as a result to the transmission device 10 via the communication line 12-1.

In the data processing devices 11-2 to 11-N, similarly to the data processing device 11-1, data of broadcast contents produced by respective broadcast stations such as a broadcast station B and a broadcast station Z are processed, and transmission data obtained as a result are transmitted to the transmission device 10 via the communication lines 12-2 to 12-N.

The transmission device 10 receives the transmission data transmitted from the data processing devices 11-1 to 11-N on the broadcast station side via the communication lines 12-1 to 12-N. The transmission device 10 performs necessary processing such as coding and modulation on the transmission data from the data processing devices 11-1 to 11-N, and transmits broadcast signals obtained as a result from an antenna for transmission installed in the transmission station.

As a result, the broadcast signals from the transmission device 10 on the transmission station side are each transmitted to the reception devices 20-1 to 20-M by radio waves in a predetermined frequency band.

The reception devices 20-1 to 20-M are configured as fixed receivers, for example, a television receiver, a Set Top Box (STB), and the like, and are installed at respective user's home or the like.

The reception device 20-1 receives a broadcast signal transmitted from the transmission device 10 by radio waves in a predetermined frequency band and performs necessary processing such as demodulation, decryption, and decoding, thereby reproducing a broadcast content (for example, a broadcast program) depending on a channel selection operation by the user.

In the reception devices 20-2 to 20-M, similarly to the reception device 20-1, the broadcast signals from the transmission device 10 are processed, and a broadcast content is reproduced depending on the channel selection operation by the user.

In this way, in the reception device 20, an image of the broadcast content is displayed on a display, and a sound synchronized with the image is output from a speaker, so that the user can view and listen to the broadcast content such as a broadcast program.

Note that, in the transmission system 1, M reception devices 20 are a mixture of those compatible with the current system and those compatible with the next-generation system. Thus, in the following description, the reception device 20 compatible with the current system is referred to as a current reception device 20L, and the reception device 20 compatible with the next-generation system (that is, compatible with only the next-generation system, or compatible with both the current system and the next-generation system) is referred to as a next-generation reception device 20N, to distinguish them from each other. However, in a case where it is not necessary to distinguish between the current reception device 20L and the next-generation reception device 20N, it is simply referred to as the reception device 20.

By the way, in Japan, studies are being conducted on the sophistication of terrestrial digital television broadcasting toward the next generation. Here, as one of methods of transitioning from a current broadcast system (current system) to a next-generation broadcast system (next-generation system), it is being studied to introduce a next-generation system having a compatibility by using a current frequency band.

In a period of transition of the broadcast system, a system is assumed in which a broadcast signal of the current system (hereinafter, also referred to as a current broadcast signal) and a broadcast signal of the next-generation system (hereinafter, also referred to as a next-generation broadcast signal) are transmitted by adopting a Multiple Input Multiple Output (MIMO) system using a plurality of antennas for transmission and reception.

Specifically, in Japan, an Integrated Services Digital Broadcasting-Terrestrial (ISDB-T) system is adopted as the current system of the terrestrial digital television broadcasting. In the ISDB-T system, a frequency band of a plurality of subcarriers subjected to Orthogonal Frequency Division Multiplexing (OFDM) and assigned to one channel (frequency band) is divided into 13 segments. Note that, OFDM is a type of digital modulation in which a plurality of different subcarriers is formed in a certain frequency band and transmitted simultaneously to perform multiplexing.

Then, among the 13 segments, 12 segments are used for broadcasting for fixed receivers, and the remaining 1 segment is used for broadcasting for mobile receivers (so-called one segment broadcasting). Furthermore, broadcast data is transmitted simultaneously in these 13 segments.

As a wireless technology that expands the transmission capacity without increasing the frequency bandwidth compared to the current system (ISDB-T system) having such a segment configuration, use of the MIMO system (polarized MIMO system) is assumed. That is, in the period of transition of the broadcast system, by using the MIMO system (polarized MIMO system), it is possible to transmit the broadcast signal including the current broadcast signal and the next-generation broadcast signal by the horizontally polarized wave, and transmit the broadcast signal including the next-generation broadcast signal by the vertically polarized wave.

Figure 2:
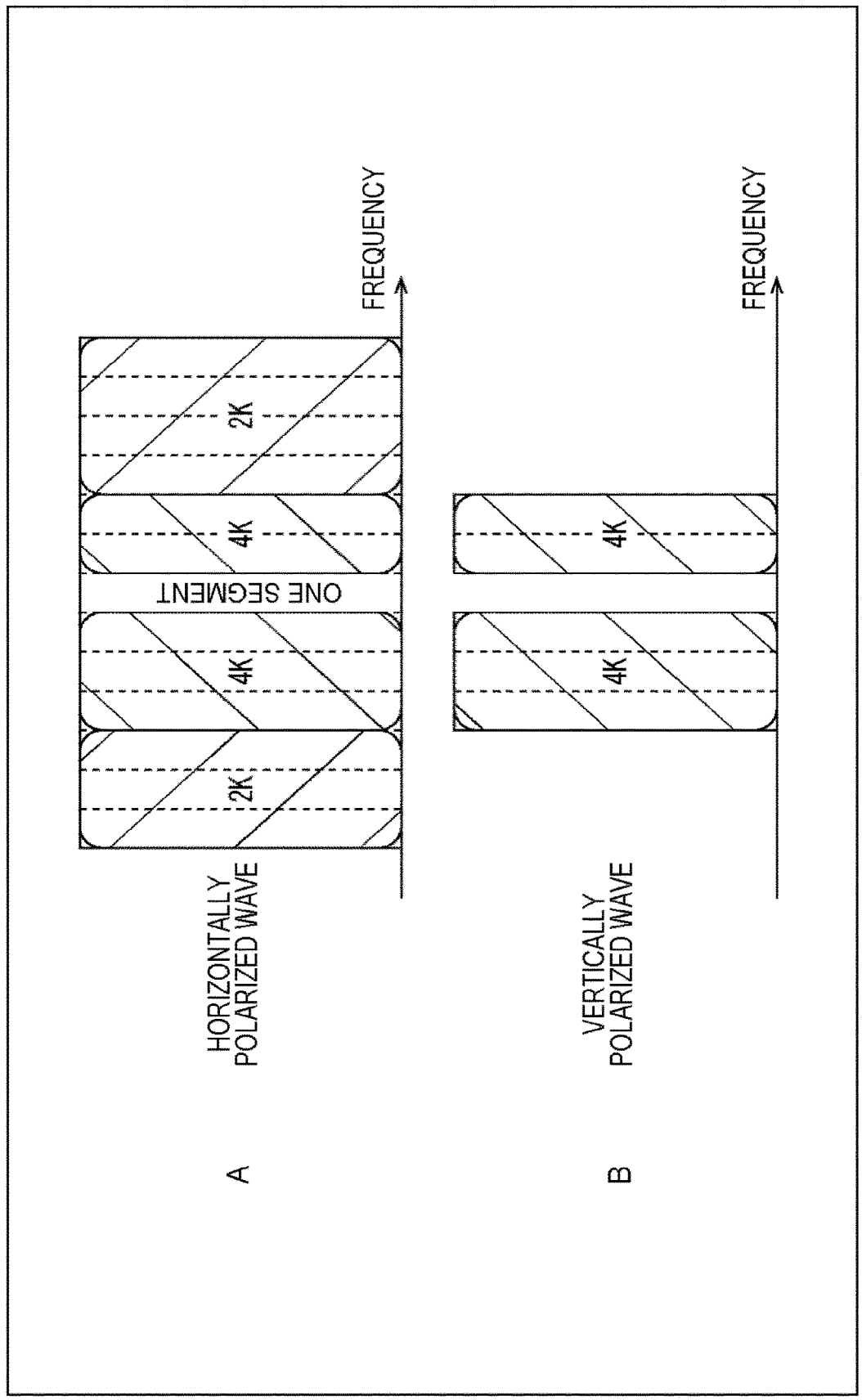
FIG. 2 is a diagram schematically illustrating transmission of a MIMO system.

Here, FIG. 2 schematically illustrates transmission of the MIMO system. In FIG. 2, the horizontal axis represents a frequency.

In FIG. 2, a frequency band of one channel is illustrated, and as illustrated by broken lines in the vertical direction, each frequency band includes a plurality of segments (for example, 13 segments in the case of the current system (ISDB-T system)).

Here, since the MIMO system is used, the broadcast signal including the current broadcast signal and the next-generation broadcast signal, that is, the current 2K broadcasting, the one segment broadcasting, and the next-generation 4K broadcasting are transmitted by the horizontally polarized wave, as illustrated in A of FIG. 2.

Specifically, among the 13 segments, the central 1 segment is used for the one segment broadcasting, the left and right 3 segments and 2 segments are used for the next-generation 4K broadcasting, and further, the left and right 3 segments and 4 segments are used for the current 2K broadcasting.

Note that, in (the current broadcast signal of) the current 2K broadcasting, a 2K content compatible with a 2K image is transmitted. Furthermore, in (the next-generation broadcast signal of) the next-generation 4K broadcasting, a 4K content compatible with a 4K image is transmitted.

On the other hand, as illustrated in B of FIG. 2, the broadcast signal including the next-generation broadcast signal, that is, the next-generation 4K broadcasting is transmitted by the vertically polarized wave.

Specifically, as a configuration of the vertically polarized wave, five segments corresponding to three segments and two segments on the left and right of the central one segment are used for the next-generation 4K broadcasting, in correspondence with the horizontally polarized wave described above.

The broadcast signal including such horizontally polarized wave and vertically polarized wave is transmitted from the transmission device 10, whereby the broadcast signal of the horizontally polarized wave is received by the current reception device 20L, and it is possible to view and listen to 2K contents compatible with the current 2K broadcasting, and the like. Furthermore, the broadcast signals of the horizontally polarized wave and the vertically polarized wave are received by the next-generation reception device 20N, and it is possible to view and listen to a 4K content compatible with the next-generation 4K broadcasting.

As described above, there is the MIMO system as a system of expanding the segment configuration of the current system (ISDB-T system) and adding the next-generation broadcast signal of next-generation 4K broadcasting, and by using this system, the next-generation 4K broadcasting can be transmitted with the specifications of the current system (ISDB-T system). For that reason, (the 4K content of) the next-generation 4K broadcasting can be transmitted to the next-generation reception device 20N by using some segments without affecting the current reception device 20L.

Here, in the ISDB-T system as the current system, Transmission Multiplexing Configuration Control (TMCC) is defined as a transmission control signal. The TMCC signal includes information such as a modulation system of each layer and transmission parameters such as an error correction coding rate.

Since a TMCC signal used in the next-generation 4K broadcasting is different from a TMCC signal used in the current 2K broadcasting, when (the next-generation broadcast signal of) the next-generation 4K broadcasting is included in the broadcast signal of the horizontally polarized wave in a case where the MIMO system is used, there is no problem with a data carrier, but the TMCC signal affects the current reception device 20L unless it is a TMCC signal compatible with the current 2K broadcasting.

Thus, in the present technology, in a case where the MIMO system is used in the period of transition from the current system to the next-generation system, a TMCC signal compatible with the specifications of the current system (hereinafter referred to as a current TMCC signal) is transmitted in the broadcast signal of the horizontally polarized wave, while a TMCC signal compatible with the specifications of the next-generation system (hereinafter referred to as a next-generation TMCC signal) is transmitted in the broadcast signal of the vertically polarized wave.

As a result, the current reception device 20L that receives the broadcast signal of the horizontally polarized wave can receive the current TMCC signal included in the broadcast signal of the horizontally polarized wave, and the next-generation reception device 20N that receives the broadcast signals of the horizontally polarized wave and the vertically polarized wave can receive the next-generation TMCC signal included in the broadcast signal of the vertically polarized wave. For that reason, it is possible to transmit the next-generation TMCC signal to the next-generation reception device 20N without affecting the current reception device 20L that receives only the broadcast signal of the horizontally polarized wave.

Hereinafter, with reference to FIGS. 3 to 10, detailed description will be given of the present technology in which, in the period of transition, the MIMO system is used and only the next-generation reception device 20N is enabled to receive the next-generation TMCC signal without affecting the current reception device 20L.

(Arrangement Example of Horizontally Polarized Wave)

Figure 3:
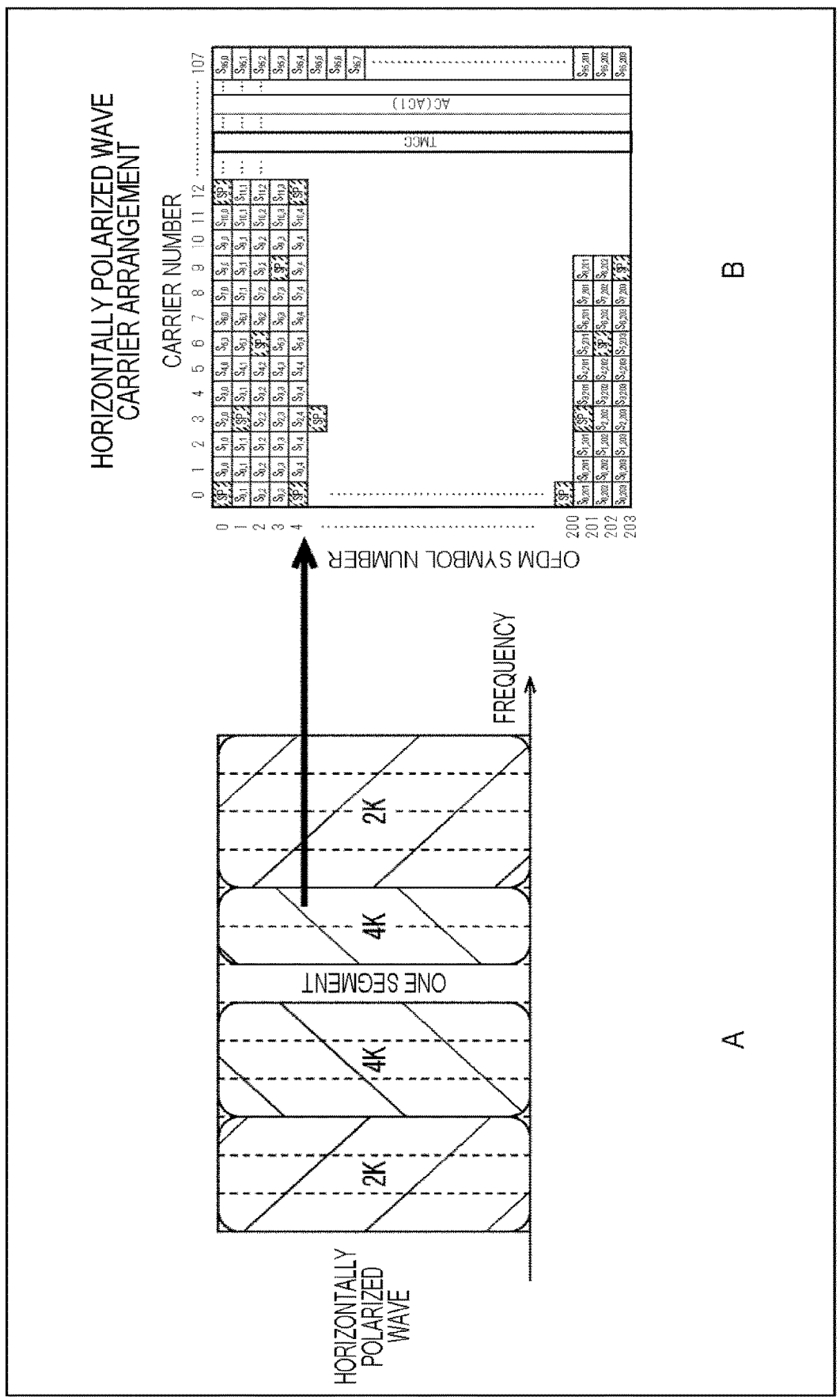
FIG. 3 is a diagram illustrating an example of horizontally polarized wave carrier arrangement.

FIG. 3 illustrates an example of horizontally polarized wave carrier arrangement.

In FIG. 3, the current TMCC signal is included in the broadcast signal of the horizontally polarized wave (A of FIG. 3). Furthermore, the horizontally polarized wave carrier arrangement conforms to the current system (ISDB-T system) (B of FIG. 3).

That is, B of FIG. 3 illustrates a configuration of horizontally polarized wave carriers when the horizontal direction is the carrier number (frequency axis) and the vertical direction is the OFDM symbol number (time axis), and each rectangle marked with a letter "S" or "SP" arranged in the vertical and horizontal directions represents a modulation symbol.

In B of FIG. 3, among the modulation symbols, a modulation symbol with the letter "S" is a data symbol used for data transmission, and a modulation symbol with the letter "SP" is a pilot symbol (pilot signal). The pilot symbol is used as a reference signal.

For example, pilot symbols are arranged discretely in the time and frequency directions to have resolutions in the time and frequency directions with a small number of pilot symbols, and from this state, the pilot symbol is referred to as a Scattered Pilot (SP) symbol (SP signal). Furthermore, subscripts of $S_{i,j}$ written on a data symbol mean that the data symbol is the i-th data symbol in the frequency direction and the j-th data symbol in the time direction.

Furthermore, in B of FIG. 3, as carriers of the horizontally polarized wave, a TMCC carrier that transmits a TMCC signal and an Auxiliary Channel (AC) carrier that transmits an AC signal are included. The TMCC signal is a transmission control signal including transmission parameters and the like. The AC signal includes additional information regarding broadcasting.

Here, in the present technology, the horizontally polarized wave carrier arrangement conforms to the current system (ISDB-T system), and not only the carrier arrangement but also the TMCC signal transmitted by the TMCC carrier is also the current TMCC signal compatible with the specifications of the current system (ISDB-T system). In other words, in the period of transition, the current TMCC signal is transmitted together with the broadcast content compatible with the current 2K broadcasting and the one segment broadcasting, in the horizontally polarized wave by the MIMO system.

Note that, in the current reception device 20L, a case is assumed where communication path estimation and transmission path quality measurement are performed using the TMCC signal, so the current TMCC signal transmitted by the broadcast signal of the horizontally polarized wave desirably has the same quality as the current status.

(Arrangement Example of Vertically Polarized Wave)

Figure 4:
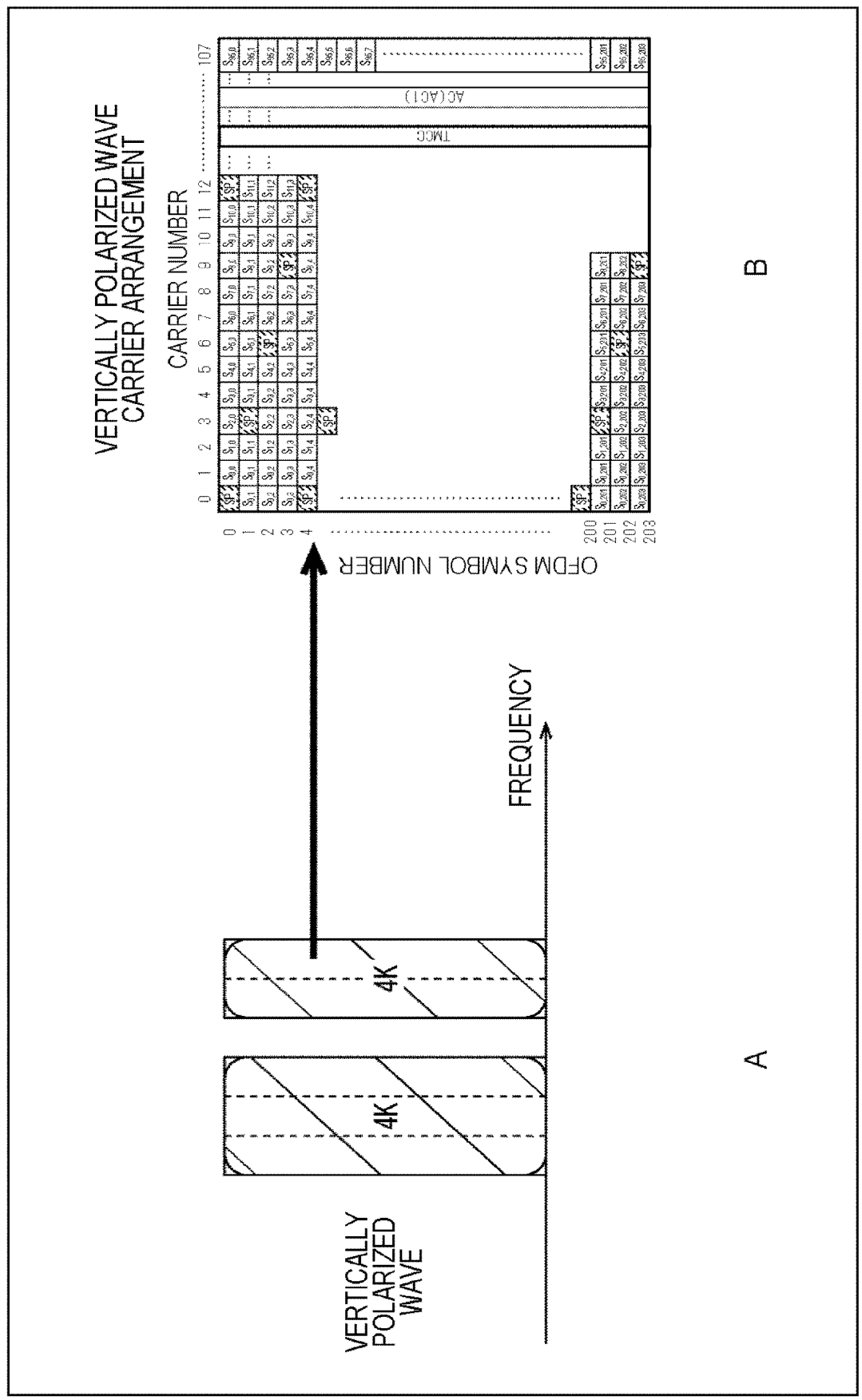
FIG. 4 is a diagram illustrating a first example of vertically polarized wave carrier arrangement.

FIG. 4 illustrates a first example of vertically polarized wave carrier arrangement.

In FIG. 4, the next-generation TMCC signal is included in the broadcast signal of the vertically polarized wave (A of FIG. 4). Furthermore, the vertically polarized wave carrier arrangement conforms to, for example, the current system (ISDB-T system) (B of FIG. 4).

That is, B of FIG. 4 illustrates a configuration of vertically polarized wave carriers when the horizontal direction is the carrier number and the vertical direction is the OFDM symbol, and corresponds to the configuration of the horizontally polarized wave carrier arrangement illustrated in B of FIG. 3.

Note that, here, a case where the vertically polarized wave carrier arrangement (B of FIG. 4) corresponds to the horizontally polarized wave carrier arrangement (B of FIG. 3) will be described as an example, but the vertically polarized wave carrier arrangement may conform to the next-generation system and differ from the horizontally polarized wave carrier arrangement.

Here, in the present technology, the vertically polarized wave carrier arrangement conforms to the next-generation system (next-generation system of the ISDB-T system), and further, not only the carrier arrangement but also the TMCC signal transmitted by the TMCC carrier is a next-generation TMCC signal compatible with the specifications of the next-generation system. In other words, in the period of transition, the next-generation TMCC signal is transmitted together with the broadcast content compatible with the next-generation 4K broadcasting, in the vertically polarized wave by the MIMO system.

As described above, in the present technology, the current TMCC signal is transmitted by (the TMCC carrier of) the horizontally polarized wave by the MIMO system, and the next-generation TMCC signal is transmitted by (the TMCC carrier of) the vertically polarized wave, whereby, in the horizontally polarized wave, the same transmission control signal (current TMCC signal) as the current 2K broadcasting and the one segment broadcasting is transmitted even in the segments (the left and right three segments and two segments with respect to the central one segment) compatible with next-generation 4K broadcasting.

That is, the TMCC signal needs to transmit the same information in all the segments (for example, all the 13 segments) to enhance noise immunity, and if different information is transmitted, a problem may occur in the current reception device 20L side. Thus, in the present technology, only the current TMCC signal is transmitted in (the TMCC carrier of) the horizontally polarized wave, and the next-generation TMCC signal is transmitted using (the TMCC carrier of) the vertically polarized wave.

Figure 5:
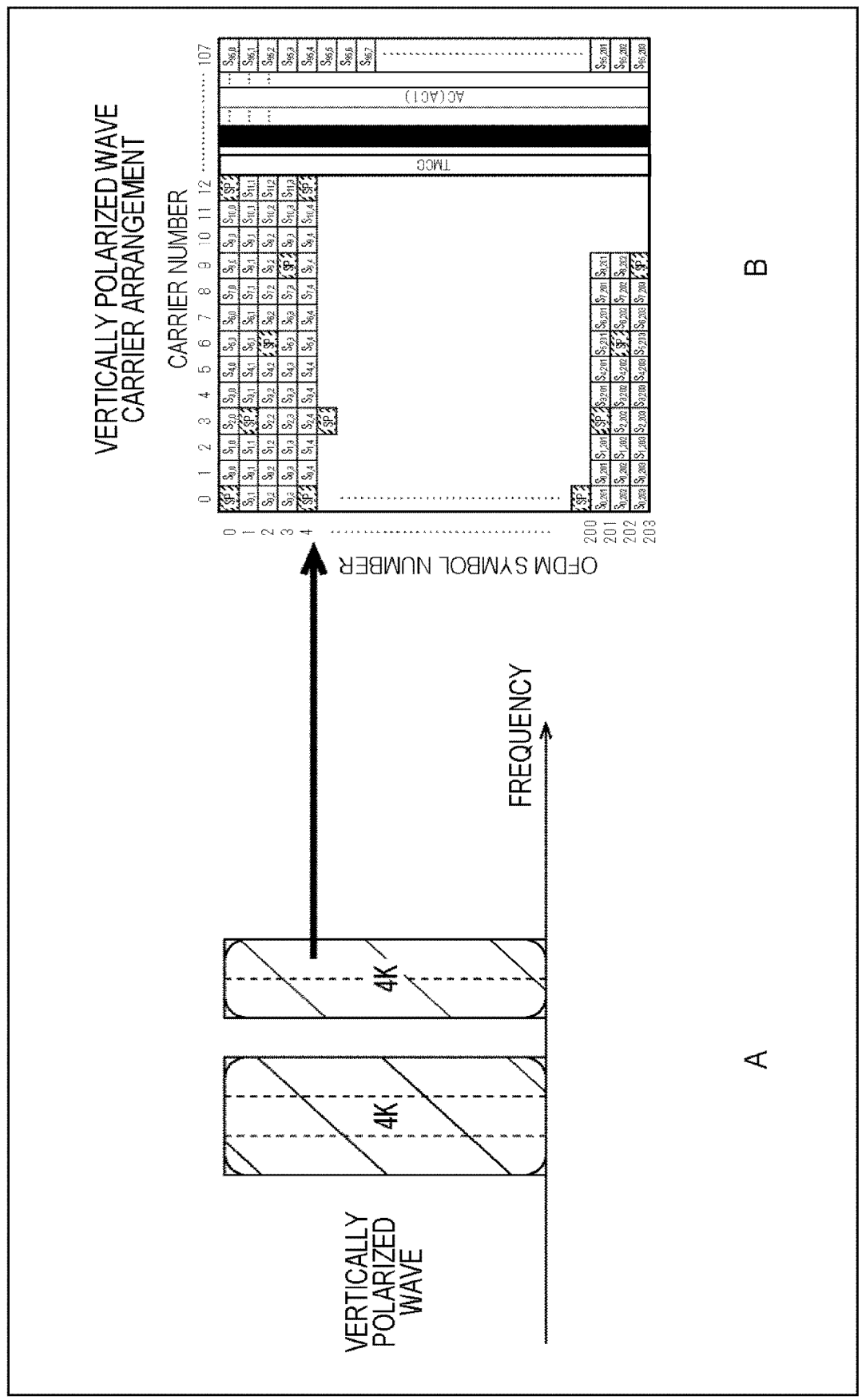
FIG. 5 is a diagram illustrating a second example of the vertically polarized wave carrier arrangement.

FIG. 5 illustrates a second example of vertically polarized wave carrier arrangement.

In the vertically polarized wave carrier, the position of the TMCC carrier is not limited to the example illustrated in B of FIG. 4, and may be arranged at another carrier position. For example, in B of FIG. 5, the carrier position corresponding to the current TMCC signal is set to NULL (black portion in the figure), and another carrier position is set as the TMCC carrier to transmit the next-generation TMCC signal.

That is, in the present technology, only the current TMCC signal is transmitted in (the TMCC carrier of) the horizontally polarized wave, and the next-generation TMCC signal is transmitted using (the TMCC carrier of) the vertically polarized wave, but in the current reception device 20L, communication path estimation and the like may be performed using the received signal of the TMCC signal.

Here, in a case where the MIMO system is used, interference between the horizontally polarized wave and the vertically polarized wave may occur due to rotation of the carrier radio wave and signal separation of the antenna signal for example; however, in the present technology, in the vertically polarized wave, the carrier position corresponding to the current TMCC signal (the carrier position where the current TMCC signal is arranged) in the horizontally polarized wave is set to NULL (the black portion in the figure), and the next-generation TMCC signal is arranged at another carrier position.

As a result, the position of the TMCC carrier of the horizontally polarized wave that transmits the current TMCC signal and the position of the TMCC carrier of the vertically polarized wave that transmits the next-generation TMCC signal are different from each other, so that interference with the horizontally polarized wave due to the vertically polarized wave can be suppressed.

Furthermore, in a case where the positions of the TMCC carriers are made different between the horizontally polarized wave and the vertically polarized wave, it is desirable that the position of the TMCC carrier in the vertically polarized wave is different from the carrier position of the SP signal (scattered pilot symbol) of the current system in the horizontally polarized wave in consideration of the influence on the SP signal of the current system in the horizontally polarized wave.

As described above, in the vertically polarized wave that transmits the next-generation TMCC signal, the carrier position and signal format do not have to be the same as the current system (ISDB-T system), and various transmission methods can be used as the transmission method of the next-generation TMCC signal in the vertically polarized wave, for example, as illustrated in FIG. 5, the positions of the TMCC carriers are made different between the horizontally polarized wave and the vertically polarized wave.

For example, as another transmission method, in the vertically polarized wave, the information to be included in the next-generation TMCC signal and the carrier position are matched with the specifications of the next-generation system, whereby control by the next-generation reception device 20N can be made common between the period of transition and the after-transition.

(Configuration of Transmission Device)

Figure 6:
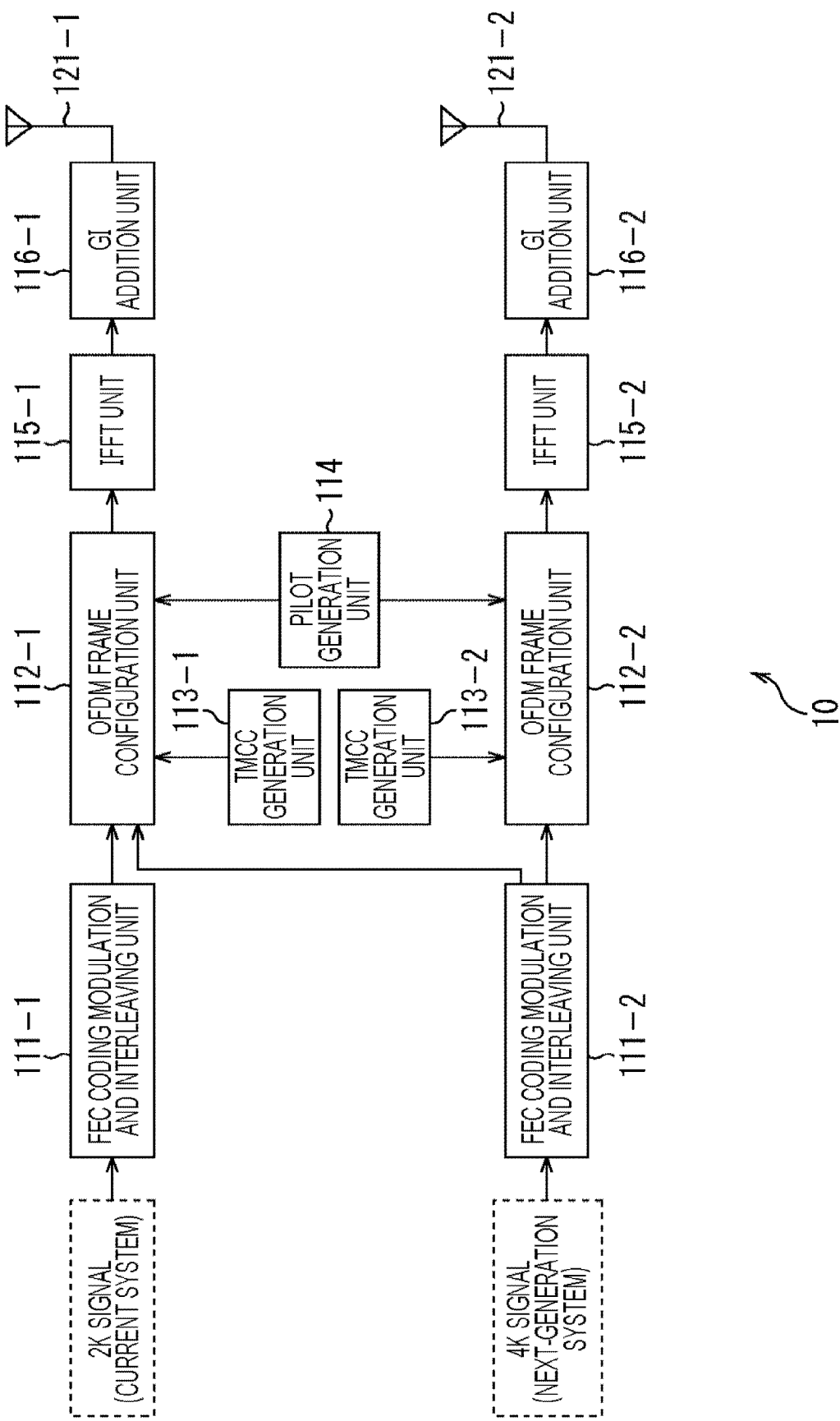
FIG. 6 is a block diagram illustrating an example of a configuration of a transmission device.

FIG. 6 is a block diagram illustrating an example of a configuration of the transmission device 10 of FIG. 1.

In FIG. 6, the transmission device 10 includes an FEC coding modulation and interleaving unit 111-1, an FEC coding modulation and interleaving unit 111-2, an OFDM frame configuration unit 112-1, an OFDM frame configuration unit 112-2, a TMCC generation unit 113-1, a TMCC generation unit 113-2, a pilot generation unit 114, an IFFT unit 115-1, an IFFT unit 115-2, a GI addition unit 116-1, and a GI addition unit 116-2.

The FEC coding modulation and interleaving unit 111-1 is a signal processing unit that performs processing related to forward error correction (FEC) and interleaving compatible with the specifications of the current system. A 2K content signal (2K signal) is input as transmission data to the FEC coding modulation and interleaving unit 111-1.

The FEC coding modulation and interleaving unit 111-1 performs processing, for example, forward error correction coding modulation processing, time interleaving, frequency interleaving, and the like on the 2K signal input to the FEC coding modulation and interleaving unit 111-1, and supplies a 2K FEC signal obtained as a result to the OFDM frame configuration unit 112-1.

Furthermore, the FEC coding modulation and interleaving unit 111-2 is a signal processing unit that performs processing related to forward error correction (FEC) and interleaving compatible with the specifications of the next-generation system. A 4K content signal (4K signal) is input as transmission data to the FEC coding modulation and interleaving unit 111-2.

The FEC coding modulation and interleaving unit 111-2 performs processing, for example, forward error correction coding modulation processing, time interleaving, frequency interleaving, and the like on the 4K signal input to the FEC coding modulation and interleaving unit 111-2, and supplies a 4K FEC signal obtained as a result to the OFDM frame configuration unit 112-1 and the OFDM frame configuration unit 112-2.

The TMCC generation unit 113-1 generates the current TMCC signal as a transmission control signal compatible with the current system, and supplies the signal to the OFDM frame configuration unit 112-1.

The TMCC generation unit 113-2 generates the next-generation TMCC signal as a transmission control signal compatible with the next-generation system and supplies the signal to the OFDM frame configuration unit 112-2.

Note that, information, for example, an FEC block pointer and the like is added to the next-generation TMCC signal as compared with the current TMCC signal. The FEC block pointer is a pointer indicating an offset of the start position of an FEC block included at the start of an OFDM frame.

The pilot generation unit 114 generates a pilot signal (SP signal) and supplies the SP signal to the OFDM frame configuration unit 112-1 and the OFDM frame configuration unit 112-2.

The OFDM frame configuration unit 112-1 is (a part of) a transmission unit that performs processing related to an OFDM frame compatible with the specifications of the current system. To the OFDM frame configuration unit 112-1, the 2K FEC signal from the FEC coding modulation and interleaving unit 111-1, the 4K FEC signal from the FEC coding modulation and interleaving unit 111-2, the current TMCC signal from the TMCC generation unit 113-1, and the pilot signal from the pilot generation unit 114 are supplied.

The OFDM frame configuration unit 112-1 configures the OFDM frame compatible with the current system on the basis of the 2K FEC signal, the 4K FEC signal, the current TMCC signal, and the pilot signal, and supplies a modulated signal obtained as a result to the IFFT unit 115-1.

The IFFT unit 115-1 performs inverse fast Fourier transform (IFFT) on the modulated signal supplied from the OFDM frame configuration unit 112-1 to convert the signal in the frequency domain into the signal in the time domain, and supplies a modulated signal in the time domain obtained as a result to the GI addition unit 116-1.

The GI addition unit 116-1 adds a Guard Interval (GI) to the modulated signal in the time domain supplied from the IFFT unit 115-1. The modulated signal in the time domain to which the guard interval is added is sent out (transmitted) as a broadcast signal of the horizontally polarized wave via a transmission antenna 121-1.

The OFDM frame configuration unit 112-2 is (a part of) a transmission unit that performs processing related to an OFDM frame compatible with the specifications of the next-generation system. To the OFDM frame configuration unit 112-2, the 4K FEC signal from the FEC coding modulation and interleaving unit 111-2, the next-generation TMCC signal from the TMCC generation unit 113-2, and the pilot signal from the pilot generation unit 114 are supplied.

The OFDM frame configuration unit 112-2 configures the OFDM frame compatible with the next-generation system on the basis of the 4K FEC signal, the next-generation TMCC signal, and the pilot signal, and supplies a modulated signal obtained as a result to the IFFT unit 115-2.

The IFFT unit 115-2 performs IFFT on the modulated signal supplied from the OFDM frame configuration unit 112-2 to convert the signal in the frequency domain into the signal in the time domain, and supplies a modulated signal in the time domain obtained as a result to the GI addition unit 116-2.

The GI addition unit 116-2 adds a guard interval (GI) to the modulated signal in the time domain supplied from the IFFT unit 115-2. The modulated signal in the time domain to which the guard interval is added is sent out (transmitted) as a broadcast signal of the vertically polarized wave via a transmission antenna 121-2.

In the transmission device 10 configured as described above, the MIMO system is used, whereby the current TMCC signal is transmitted together with the 2K signal and the 4K signal by the broadcast signal of the horizontally polarized wave (horizontally polarized wave of FIG. 3) transmitted via the transmission antenna 121-1, and the next-generation TMCC signal is transmitted together with the 4K signal by the broadcast signal of the vertically polarized wave (vertically polarized wave of FIG. 4 or 5) transmitted via the transmission antenna 121-2.

Note that, in the transmission device 10 illustrated in FIG. 6, the broadcast signal of the horizontally polarized wave is transmitted by the OFDM frame configuration unit 112-1, the IFFT unit 115-1, and the GI addition unit 116-1 via the transmission antenna 121-1, and the broadcast signal of the vertically polarized wave is transmitted by the OFDM frame configuration unit 112-2, the IFFT unit 115-2, and the GI addition unit 116-2 via the transmission antenna 121-2. For that reason, in the transmission device 10 illustrated in FIG. 6, it can also be said that a transmission unit is configured by the OFDM frame configuration units 112-1 and 112-2, the IFFT units 115-1 and 115-2, and the GI addition units 116-1 and 116-2.

Furthermore, for the sake of simplification of the explanation, only the current 2K broadcasting has been described here as a broadcasting service of the current system (ISDB-T system), but in reality, the one segment broadcasting is also included. That is, in the current system (ISDB-T system), among the 13 segments, 12 segments are used for broadcasting (current 2K broadcasting) for fixed receivers, and the remaining 1 segment is used for broadcasting (one segment broadcasting) for mobile receivers.

(Flow of Transmission Processing)

Here, a flow of transmission processing executed by the transmission device 10 of FIG. 6 will be described with reference to a flowchart of FIG. 7.

In step S101, the FEC coding modulation and interleaving unit 111-1 performs processing such as forward error correction coding modulation processing, time interleaving, and frequency interleaving on the 2K signal input to the FEC coding modulation and interleaving unit 111-1.

In step S102, the FEC coding modulation and interleaving unit 111-2 performs processing such as forward error correction coding modulation processing, time interleaving, and frequency interleaving on the 4K signal input to the FEC coding modulation and interleaving unit 111-2.

In step S103, the TMCC generation unit 113-1 generates the current TMCC signal. Furthermore, in step S104, the TMCC generation unit 113-2 generates the next-generation TMCC signal. Note that, at this time, the pilot signal (SP signal) is generated by the pilot generation unit 114.

In step S105, the OFDM frame configuration unit 112-1 configures (generates) the OFDM frame compatible with the current system on the basis of the 2K FEC signal, the 4K FEC signal, the current TMCC signal, and the pilot signal.

In step S106, the OFDM frame configuration unit 112-2 configures (generates) the OFDM frame compatible with the next-generation system on the basis of the 4K FEC signal, the next-generation TMCC signal, and the pilot signal.

IFFT or addition of the guard interval is performed on the modulated signal of the OFDM frame generated in this way. Then, the broadcast signal including the current TMCC signal together with the 2K signal and the 4K signal is sent out as the horizontally polarized wave via the transmission antenna 121-1 (S107), and the broadcast signal including the next-generation TMCC signal together with the 4K signal is sent out as the vertically polarized wave via the transmission antenna 121-2 (S108).

Figure 7:
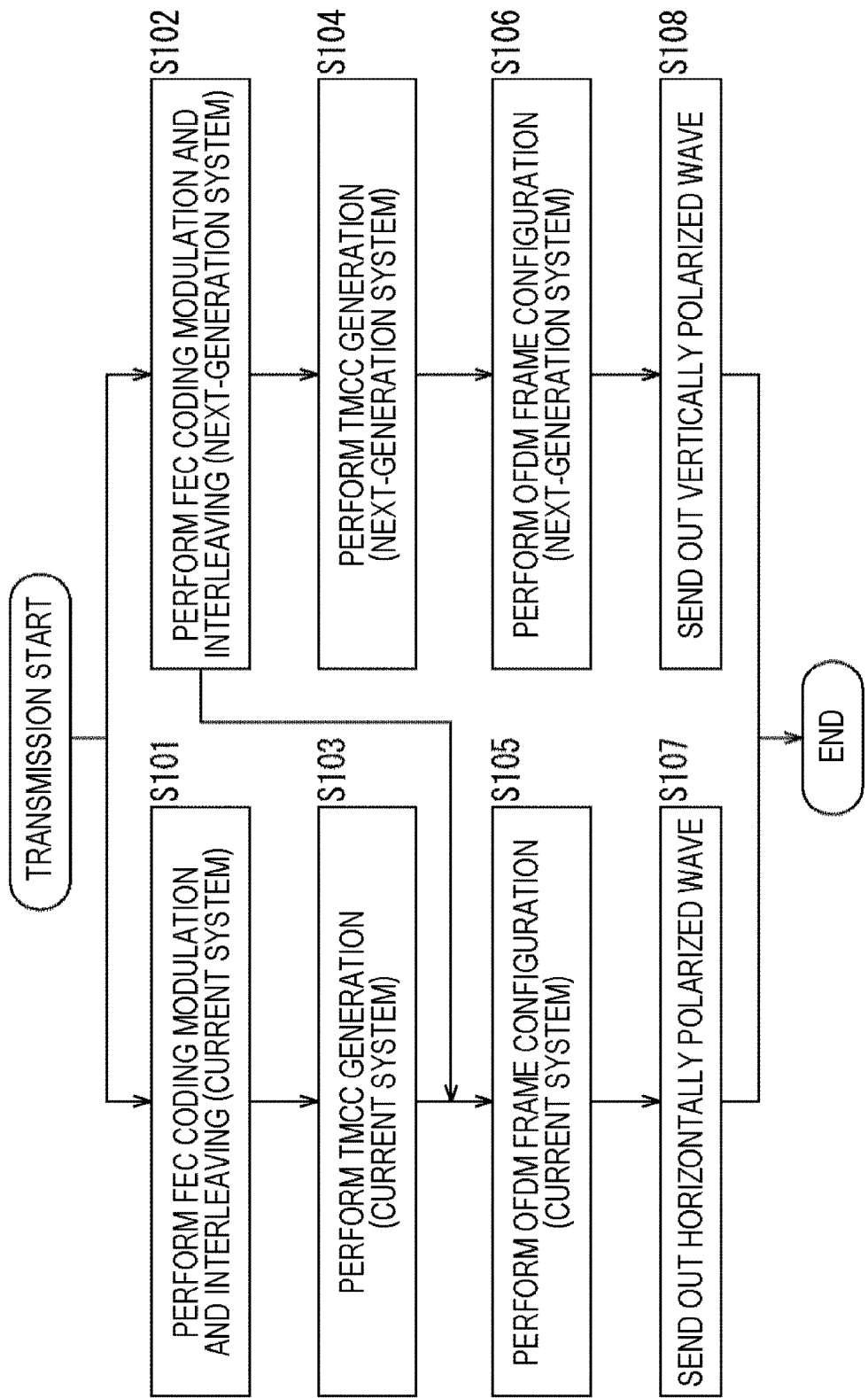
FIG. 7 is a flowchart explaining a flow of transmission processing.

When the processing of steps S107 and S108 ends, the transmission processing illustrated in FIG. 7 is ended.

The flow of the transmission processing has been described above.

(Configuration of Reception Device)

Figure 8:
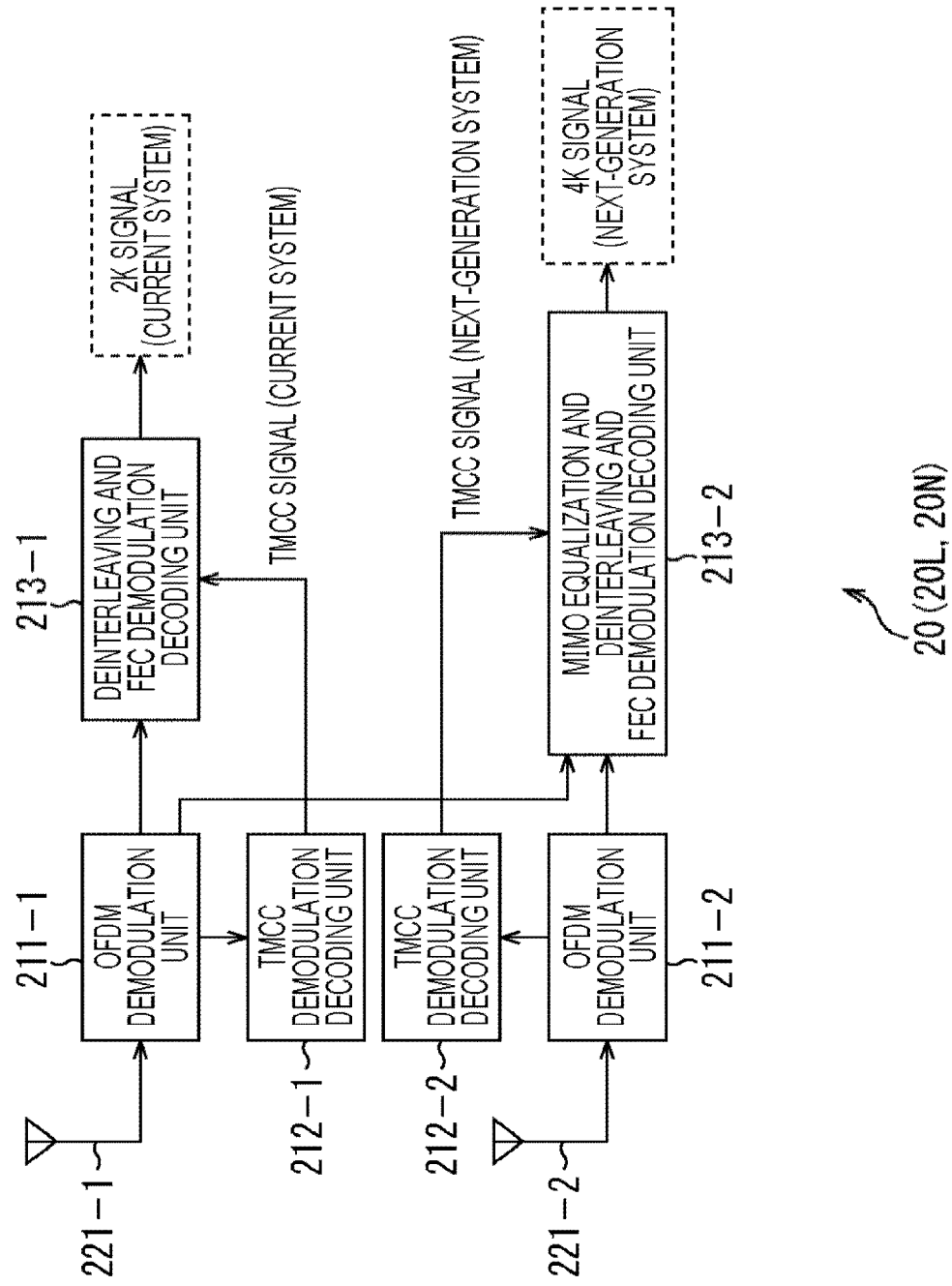
FIG. 8 is a block diagram illustrating an example of a configuration of a reception device.

FIG. 8 is a block diagram illustrating an example of a configuration of the reception device 20 of FIG. 1.

In FIG. 8, the reception device 20 includes an OFDM demodulation unit 211-1, an OFDM demodulation unit 211-2, a TMCC demodulation decoding unit 212-1, a TMCC demodulation decoding unit 212-2, a deinterleaving and FEC demodulation decoding unit 213-1, and a MIMO equalization and deinterleaving and FEC demodulation decoding unit 213-2.

Note that, although FIG. 8 illustrates the configuration of the reception device 20 compatible with both the current system and the next-generation system, the current reception device 20L includes at least the OFDM demodulation unit 211-1, the TMCC demodulation decoding unit 212-1, and the deinterleaving and FEC demodulation decoding unit 213-1. Furthermore, the next-generation reception device 20N includes at least the OFDM demodulation unit 211-1, the OFDM demodulation unit 211-2, the TMCC demodulation decoding unit 212-2, and the MIMO equalization and deinterleaving and FEC demodulation decoding unit 213-2.

The OFDM demodulation unit 211-1 is (a part of) a reception unit that performs processing related to the OFDM frame compatible with the specifications of the current system. The OFDM demodulation unit 211-1 performs OFDM demodulation processing on the broadcast signal of the horizontally polarized wave received via a reception antenna 221-1, and supplies a demodulated signal obtained as a result to the TMCC demodulation decoding unit 212-1, the deinterleaving and FEC demodulation decoding unit 213-1, and the MIMO equalization and deinterleaving and FEC demodulation decoding unit 213-2.

Note that, examples of the OFDM demodulation processing by the OFDM demodulation unit 211-1 include, for example, processing of removing the guard interval (GI), Fast Fourier Transform (FFT) that converts the signal in the time domain into the signal in the frequency domain, processing of demodulating the OFDM frame, and the like.

The TMCC demodulation decoding unit 212-1 performs TMCC demodulation decoding processing on the demodulated signal supplied from the OFDM demodulation unit 211-1, and supplies the current TMCC signal obtained as a result to the deinterleaving and FEC demodulation decoding unit 213-1.

The deinterleaving and FEC demodulation decoding unit 213-1 is a signal processing unit that performs processing related to forward error correction (FEC) and deinterleaving compatible with the specifications of the current system.

The deinterleaving and FEC demodulation decoding unit 213-1 performs processing, for example, frequency deinterleaving, time deinterleaving, forward error correction demodulation decoding processing, and the like on the demodulated signal (2K FEC signal) supplied from the OFDM demodulation unit 211-1 on the basis of the current TMCC signal supplied from the TMCC demodulation decoding unit 212-1, and outputs a 2K signal obtained as a result to a subsequent circuit (for example, a decoder or the like).

The OFDM demodulation unit 211-2 is (a part of) a reception unit that performs processing related to the OFDM frame compatible with the next-generation system. The OFDM demodulation unit 211-2 performs OFDM demodulation processing on the broadcast signal of the vertically polarized wave received via a reception antenna 221-2, and supplies a demodulated signal obtained as a result to the TMCC demodulation decoding unit 212-2, and the MIMO equalization and deinterleaving and FEC demodulation decoding unit 213-2.

Note that, examples of the OFDM demodulation processing by the OFDM demodulation unit 211-2 include, for example, processing of removing the guard interval (GI), Fast Fourier Transform (FFT) that converts the signal in the time domain into the signal in the frequency domain, processing of demodulating the OFDM frame, and the like.

The MIMO equalization and deinterleaving and FEC demodulation decoding unit 213-2 is a signal processing unit that performs MIMO equalization between the received signal of the horizontally polarized wave and the received signal of the vertically polarized wave, and performs processing related to forward error correction (FEC) and deinterleaving compatible with the specifications of the next-generation system.

The MIMO equalization and deinterleaving and FEC demodulation decoding unit 213-2 performs processing, for example, MIMO equalization by a Zero Forcing (ZF) method, frequency deinterleaving, time deinterleaving, forward error correction demodulation decoding processing, and the like on the demodulated signals (4K FEC signals) respectively supplied from the OFDM demodulation unit 211-1 and the OFDM demodulation unit 211-2 on the basis of the next-generation TMCC signal supplied from the TMCC demodulation decoding unit 212-2, and outputs a 4K signal obtained as a result to the subsequent circuit.

Of the reception devices 20 configured as described above, in the current reception device 20L, the broadcast signal of the horizontally polarized wave (horizontally polarized waves of FIG. 3) by the MIMO system is received via the reception antenna 221-1, the 2K signal obtained from the broadcast signal of the horizontally polarized wave is processed on the basis of the current TMCC signal obtained from the broadcast signal of the horizontally polarized wave, and it is possible to view and listen to 2K contents.

Furthermore, in the next-generation reception device 20N, the broadcast signals of the horizontally polarized wave (horizontally polarized wave of FIG. 3) and the vertically polarized wave (vertically polarized wave of FIG. 4 or 5) by the MIMO system are respectively received by the reception antenna 221-1 and the reception antenna 221-2, the 4K signal obtained from the broadcast signals of the horizontally polarized wave and the vertically polarized wave are processed on the basis of the next-generation TMCC signal obtained from the broadcast signal of the vertically polarized wave, and it is possible to view and listen to 4K contents.

Note that, in the reception device 20 illustrated in FIG. 8, the broadcast signal of the horizontally polarized wave is received by the OFDM demodulation unit 211-1 via the reception antenna 221-1, and the broadcast signal of the vertically polarized wave is received by the OFDM demodulation unit 211-2 via the reception antenna 221-2. For that reason, in the reception device 20 illustrated in FIG. 8, it can also be said that a reception unit is configured by the OFDM demodulation unit 211-1 and the OFDM demodulation unit 211-2.

Furthermore, here, for the sake of simplification of the explanation, only the current 2K broadcasting has been described here again as the broadcasting service of the current system (ISDB-T system) without including the one segment broadcasting.

(Flow of Reception Processing Compatible with Current System)

Here, a flow of reception processing executed by the current reception device 20L of FIG. 8 will be described with reference to a flowchart of FIG. 9.

In step S201, the OFDM demodulation unit 211-1 performs the OFDM demodulation processing on the broadcast signal of the horizontally polarized wave received via the reception antenna 221-1.

In step S202, the TMCC demodulation decoding unit 212-1 performs the TMCC demodulation decoding processing on the demodulated signal of the horizontally polarized wave. By the TMCC demodulation decoding processing, the current TMCC signal transmitted by the broadcast signal of the horizontally polarized wave is obtained.

In step S203, the deinterleaving and FEC demodulation decoding unit 213-1 performs processing such as frequency deinterleaving, time deinterleaving, and forward error correction demodulation decoding processing on the current broadcast signal among the demodulated signals of the horizontally polarized wave on the basis of the current TMCC signal obtained from the broadcast signal of the horizontally polarized wave. These pieces of processing are performed, whereby the 2K signal transmitted by the broadcast signal of the horizontally polarized wave is obtained.

Then, in the current reception device 20L, processing such as decoding and rendering is performed on the 2K signal obtained from the broadcast signal of the horizontally polarized wave, whereby an image corresponding to the 2K signal is displayed on the display, and a sound synchronized with the image is output from the speaker. As a result, the user can view and listen to 2K contents.

When the processing of step S203 ends, the reception processing illustrated in FIG. 9 is ended.

(Flow of Reception Processing Compatible with Next-Generation System)

Next, a flow of reception processing executed by the next-generation reception device 20N of FIG. 8 will be described with reference to a flowchart of FIG. 10.

In step S231, the OFDM demodulation unit 211-1 performs the OFDM demodulation processing on the broadcast signal of the horizontally polarized wave received via the reception antenna 221-1. Furthermore, in step S232, the OFDM demodulation unit 211-2 performs the OFDM demodulation processing on the broadcast signal of the vertically polarized wave received via the reception antenna 221-2.

In step S233, the TMCC demodulation decoding unit 212-1 performs the TMCC demodulation decoding processing on the demodulated signal of the horizontally polarized wave. By the TMCC demodulation decoding processing, the current TMCC signal transmitted by the broadcast signal of the horizontally polarized wave is obtained, and synchronization with the demodulated signal of the vertically polarized wave (OFDM demodulated signal) can be made.

Furthermore, in step S234, the TMCC demodulation decoding unit 212-2 performs the TMCC demodulation decoding processing on the demodulated signal of the vertically polarized wave. By the TMCC demodulation decoding processing, the next-generation TMCC signal transmitted by the broadcast signal of the vertically polarized wave is obtained.

In step S235, the MIMO equalization and deinterleaving and FEC demodulation decoding unit 213-2 performs processing such as MIMO equalization, frequency deinterleaving, time deinterleaving, and forward error correction demodulation decoding processing on the next-generation broadcast signals of the demodulated signals of the horizontally polarized wave and the vertically polarized wave on the basis of the next-generation TMCC signal obtained from the broadcast signal of the vertically polarized wave. These pieces of processing are performed, whereby the 4K signal transmitted by the broadcast signals of the horizontally polarized wave and the vertically polarized wave is obtained.

Then, in the next-generation reception device 20N, processing such as decoding and rendering is performed on the 4K signal obtained from the broadcast signals of the horizontally polarized wave and the vertically polarized wave, whereby an image corresponding to the 4K signal is displayed on the display, and a sound synchronized with the image is output from the speaker. As a result, the user can view and listen to 4K contents.

When the processing of step S234 ends, the reception processing illustrated in FIG. 10 is ended.

The flow of reception processing compatible with the current system and the next-generation system has been described above.

2. Modifications (Examples of Other Broadcast Systems)

In the above description, the ISDB-T system has been described as a broadcast system for terrestrial digital television broadcasting, but the present technology may be applied to other broadcast systems. Furthermore, not limited to the ground wave (terrestrial broadcasting), the present technology may be applied to broadcast systems, for example, satellite broadcasting using a Broadcasting Satellite (BS) and a Communications Satellite (CS), or cable broadcasting using cables (Common Antenna TeleVision (CATV)).

(Other Configurations of Reception Device)

Furthermore, in the above description, the reception device 20 (FIG. 1) has been described as being configured as a fixed receiver such as a television receiver or a set top box (STB), but the fixed receiver may include electronic devices, for example, a recorder, game machine, personal computer, network storage, and the like. Moreover, the reception device 20 (FIG. 1) is not limited to the fixed receiver, and may include electronic devices, for example, a mobile receiver such as a smartphone, a mobile phone, or a tablet computer, an in-vehicle device mounted on a vehicle such as an in-vehicle television, a wearable computer such as a Head Mounted Display (HMD), and the like.

Moreover, the transmission device 10 having the configuration illustrated in FIG. 6 may be regarded as a modulation device or a modulation unit (for example, a modulation circuit). Similarly, the reception device 20 having the configuration illustrated in FIG. 8 may be regarded as a demodulation device or a demodulation unit (for example, a demodulation circuit or a demodulation IC).

(Configuration Including Communication Line)

Furthermore, in the transmission system 1 (FIG. 1), although not illustrated, various servers may be connected to a communication line such as the Internet, and the reception device 20 (FIG. 1) having a communication function may be enabled to receive various data such as contents and applications by accessing the various servers and performing bidirectional communication via the communication line such as the Internet.

(Others)

Note that, the terms used in the present disclosure are examples, and use of other terms is not intentionally excluded. For example, in the above description, the frame may be replaced by another term such a packet.

Furthermore, in the present disclosure, the "2K image" is an image compatible with a screen resolution of about 1920×1080 pixels, and the "4K image" is an image compatible with a screen resolution of about 3840×2160 pixels. Furthermore, in the above description, as broadcast contents, the 2K content of the 2K image transmitted by the current 2K broadcasting (current system) and the 4K content of the 4K image transmitted by the next-generation 4K broadcasting (next-generation system) have been described; however, a broadcast content transmitted by the next-generation system may be higher image quality content such as an 8K image. However, "8K image" is an image compatible with a screen resolution of about 7680×4320 pixels.

3. Configuration of Computer

Figure 11:
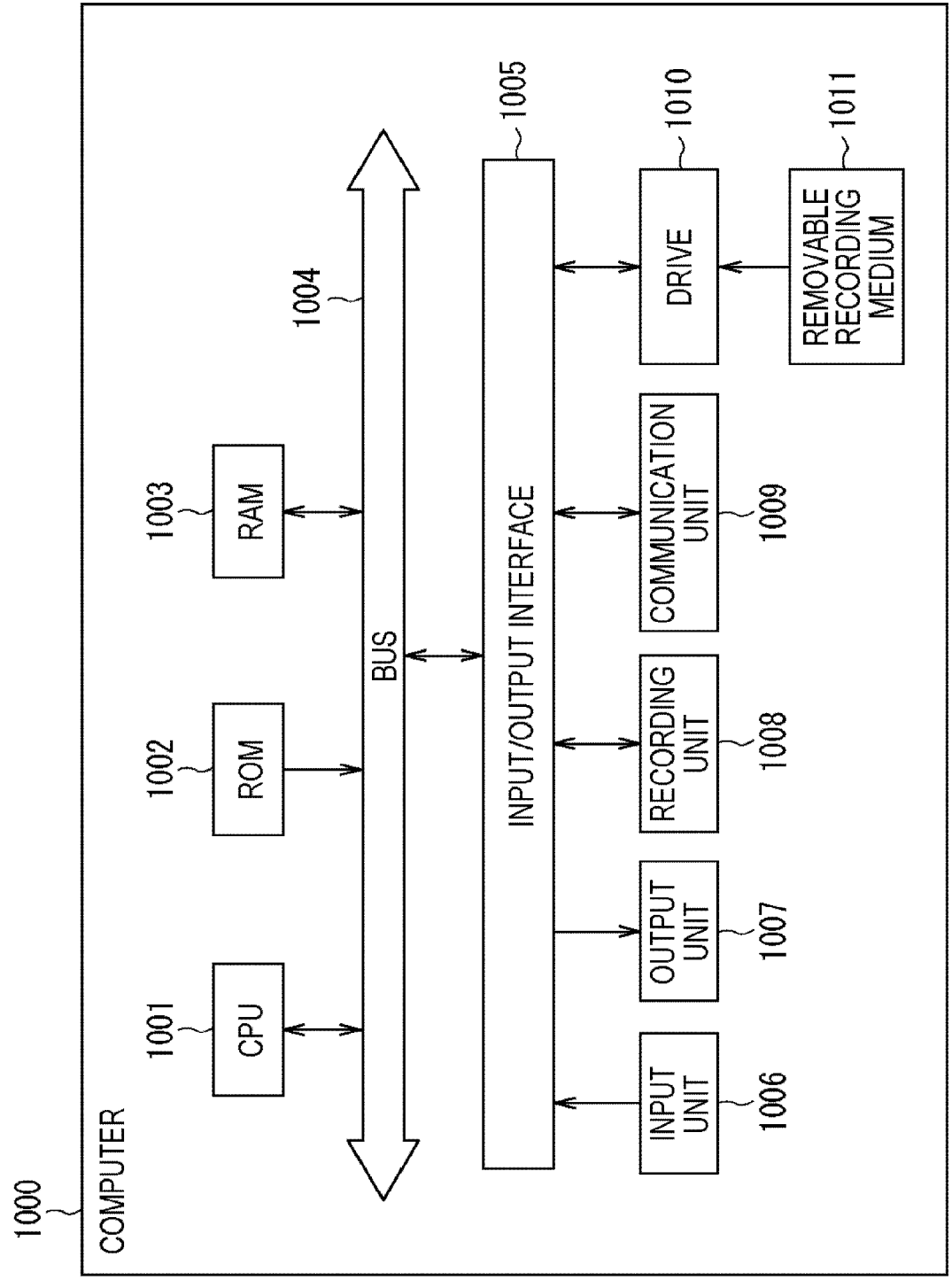
FIG. 11 is a diagram illustrating a configuration example of a computer.

A series of processing steps described above can be executed by hardware, or can be executed by software. In a case where the series of processing steps is executed by software, a program constituting the software is installed in a computer. FIG. 11 is a diagram illustrating a configuration example of hardware of the computer that executes the series of processing steps described above by the program.

In a computer 1000, a central processing unit (CPU) 1001, a read only memory (ROM) 1002, and a random access memory (RAM) 1003 are connected to each other by a bus 1004. Moreover, an input/output interface 1005 is connected to the bus 1004. The input/output interface 1005 is connected to an input unit 1006, an output unit 1007, a recording unit 1008, a communication unit 1009, and a drive 1010.

The input unit 1006 includes a keyboard, a mouse, a microphone, and the like. The output unit 1007 includes a display, a speaker, and the like. The recording unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads and executes the program recorded in the ROM 1002 or the recording unit 1008 to the RAM 1003 via the input/output interface 1005 and the bus 1004, whereby the series of processing steps described above is performed.

The program executed by the computer 1000 (CPU 1001) can be provided, for example, by being recorded in the removable recording medium 1011 as a package medium or the like. Furthermore, the program can be provided via a wired or wireless transmission medium such as a local area network, the Internet, or digital satellite broadcasting.

In the computer 1000, the program can be installed to the recording unit 1008 via the input/output interface 1005 by mounting the removable recording medium 1011 to the drive 1010. Furthermore, the program can be installed to the recording unit 1008 by receiving with the communication unit 1009 via the wired or wireless transmission medium. In addition, the program can be installed in advance to the ROM 1002 or the recording unit 1008.

Here, in the present disclosure, the processing performed by the computer in accordance with the program does not necessarily have to be performed chronologically in the order described as the flowchart. In other words, the processing performed by the computer in accordance with the program also includes processing executed in parallel or individually (for example, parallel processing or processing by an object). Furthermore, the program may be processed by one computer (processor) or may be distributed and processed by a plurality of computers.

Note that, the embodiment of the present technology is not limited to the embodiments described above, and various modifications are possible without departing from the scope of the present technology.

Furthermore, the present technology can have a configuration as follows.

(1)
A transmission device including
a transmission unit that
includes a first transmission control signal compatible with a first system in a first broadcast signal including a signal of a first content compatible with the first system and a signal of a second content compatible with a second system and transmits the first broadcast signal via a first transmission antenna, and
includes a second transmission control signal compatible with the second system in a second broadcast signal including the signal of the second content and transmits the second broadcast signal via a second transmission antenna.

(2)
The transmission device according to (1), in which
the transmission unit is compatible with a MIMO system using the first transmission antenna and the second transmission antenna,
the first broadcast signal is transmitted as a horizontally polarized wave, and
the second broadcast signal is transmitted as a vertically polarized wave.

(3)
The transmission device according to (2), in which
the first broadcast signal and the second broadcast signal are subjected to OFDM modulation, and
a position of a carrier that transmits the first transmission control signal in the horizontally polarized wave corresponds to a position of a carrier that transmits the second transmission control signal in the vertically polarized wave.

(4)
The transmission device according to (2), in which
the first broadcast signal and the second broadcast signal are subjected to OFDM modulation, and
a position of a carrier that transmits the first transmission control signal in the horizontally polarized wave is different from a position of a carrier that transmits the second transmission control signal in the vertically polarized wave.

(5)
The transmission device according to (4), in which
in the vertically polarized wave,
NULL is transmitted by a carrier at a corresponding position corresponding to the position of the carrier that transmits the first transmission control signal in the horizontally polarized wave, and
the second transmission control signal is transmitted by a carrier at a position other than the corresponding position.

(6)
The transmission device according to (5), in which
the corresponding position further includes a position corresponding to a position of a carrier that transmits a pilot signal in the horizontally polarized wave.

(7)
The transmission device according to any of (2) to (6), in which
the horizontally polarized wave includes a part of the signal of the second content, and
the vertically polarized wave includes a remaining part of the signal of the second content.

(8)
The transmission device according to any of (1) to (7), in which
the second system includes a next-generation system of the first system, and
during a period of transition between the first system and the second system, the transmission unit includes the first transmission control signal in the first broadcast signal and transmits the first broadcast signal via the first transmission antenna, and includes the second transmission control signal in the second broadcast signal and transmits the second broadcast signal via the second transmission antenna.

(9)
The transmission device according to (8), in which
the first system includes an ISDB-T system, and
the second system includes a next-generation system of the ISDB-T system.

(10)
A transmission method in which
a transmission device includes a first transmission control signal compatible with a first system in a first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna.

(11)

A reception device including a reception unit that receives a first broadcast signal transmitted from a transmission device via a first reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including a signal of the second content and transmits the second broadcast signal via a second transmission antenna.

(12)

The reception device according to (11), further including a first signal processing unit that performs processing including demodulation and decoding of the signal of the first content included in the first broadcast signal received, on the basis of the first transmission control signal included in the first broadcast signal received.

(13)

The reception device according to (11), in which the reception unit receives the first broadcast signal via the first reception antenna and receives the second broadcast signal via a second reception antenna, and a second signal processing unit is further included, the second signal processing unit performing processing including demodulation and decoding of the signals of the second content included in the first broadcast signal and the second broadcast signal received, on the basis of the second transmission control signal included in the second broadcast signal received.

(14)

The reception device according to any of (11) to (13), in which the first broadcast signal is transmitted as a horizontally polarized wave in a MIMO system, and the second broadcast signal is transmitted as a vertically polarized wave in the MIMO system.

(15)

The reception device according to (14), in which the first broadcast signal and the second broadcast signal are subjected to OFDM modulation, and a position of a carrier that transmits the first transmission control signal in the horizontally polarized wave corresponds to a position of a carrier that transmits the second transmission control signal in the vertically polarized wave.

(16)

The reception device according to (14), in which the first broadcast signal and the second broadcast signal are subjected to OFDM modulation, and a position of a carrier that transmits the first transmission control signal in the horizontally polarized wave is different from a position of a carrier that transmits the second transmission control signal in the vertically polarized wave.

(17)

The reception device according to (16), in which in the vertically polarized wave, NULL is transmitted by a carrier at a corresponding position corresponding to the position of the carrier that transmits the first transmission control signal in the horizontally polarized wave, and the second transmission control signal is transmitted by a carrier at a position other than the corresponding position.

(18)

The reception device according to (17), in which the corresponding position further includes a position corresponding to a position of a carrier that transmits a pilot signal in the horizontally polarized wave.

(19)

A reception method in which a reception device enabled to receive a broadcast signal transmitted from a transmission device receives a first broadcast signal transmitted from the transmission device via a first reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna, and the reception device performs processing including demodulation and decoding of the signal of the first content included in the first broadcast signal received, on the basis of the first transmission control signal included in the first broadcast signal received.

(20)

A reception method in which a reception device enabled to receive a broadcast signal transmitted from a transmission device receives a first broadcast signal transmitted from the transmission device via a first reception antenna and receives a second broadcast signal via a second reception antenna, the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in the second broadcast signal including the signal of the second content and transmits the second broadcast signal via a second transmission antenna, and the reception device performs processing including demodulation and decoding of the signal of the second content included in the first broadcast signal and the second broadcast signal received, on the basis of the second transmission control signal included in the second broadcast signal received.

REFERENCE SIGNS LIST

1 Transmission system
10 Transmission device 11, 11-1 to 11-N Data processing device
20, 20-1 to 20-M Reception device
20L Current reception device
20N Next-generation reception device
111-1, 111-2 FEC coding modulation and interleaving unit
112-1, 112-2 OFDM frame configuration unit
113-1, 113-2 TMCC generation unit
114 Pilot generation unit
115-1, 115-2 IFFT unit
116-1, 116-2 GI addition unit
121-1, 121-2 Transmission antenna
211-1, 211-2 OFDM demodulation unit
212-1, 212-2 TMCC demodulation decoding unit
213-1 Deinterleaving and FEC demodulation decoding unit
213-2 MIMO equalization and deinterleaving and FEC demodulation decoding unit
221-1, 221-2 Reception antenna
1000 Computer
1001 CPU

The invention claimed is:

1. A transmission device comprising
a transmission unit that
includes a first transmission control signal compatible with a first system in a first broadcast signal including a signal of a first content compatible with the first system and a signal of a second content compatible with a second system and transmits the first broadcast signal via a first transmission antenna, and
includes a second transmission control signal compatible with the second system in a second broadcast signal including the signal of the second content and transmits the second broadcast signal via a second transmission antenna.

2. The transmission device according to claim 1, wherein
the transmission unit is compatible with a MIMO system using the first transmission antenna and the second transmission antenna,
the first broadcast signal is transmitted as a horizontally polarized wave, and
the second broadcast signal is transmitted as a vertically polarized wave.

3. The transmission device according to claim 2, wherein
the first broadcast signal and the second broadcast signal are subjected to OFDM modulation, and
a position of a carrier that transmits the first transmission control signal in the horizontally polarized wave corresponds to a position of a carrier that transmits the second transmission control signal in the vertically polarized wave.

4. The transmission device according to claim 2, wherein
the first broadcast signal and the second broadcast signal are subjected to OFDM modulation, and
a position of a carrier that transmits the first transmission control signal in the horizontally polarized wave is different from a position of a carrier that transmits the second transmission control signal in the vertically polarized wave.

5. The transmission device according to claim 4, wherein
in the vertically polarized wave,
NULL is transmitted by a carrier at a corresponding position corresponding to the position of the carrier that transmits the first transmission control signal in the horizontally polarized wave, and
the second transmission control signal is transmitted by a carrier at a position other than the corresponding position.

6. The transmission device according to claim 5, wherein
the corresponding position further includes a position corresponding to a position of a carrier that transmits a pilot signal in the horizontally polarized wave.

7. The transmission device according to claim 2, wherein
the horizontally polarized wave includes a part of the signal of the second content, and
the vertically polarized wave includes a remaining part of the signal of the second content.

8. The transmission device according to claim 1, wherein
the second system includes a next-generation system of the first system, and
during a period of transition between the first system and the second system, the transmission unit includes the first transmission control signal in the first broadcast signal and transmits the first broadcast signal via the first transmission antenna, and includes the second transmission control signal in the second broadcast signal and transmits the second broadcast signal via the second transmission antenna.

9. The transmission device according to claim 8, wherein
the first system includes an ISDB-T system, and
the second system includes a next-generation system of the ISDB-T system.

10. A transmission method in which
a transmission device that
transmits a first broadcast signal via a first transmission antenna, the first broadcast signal includes a first transmission control signal compatible with a first system and a signal of a first content compatible with the first system and a signal of a second content compatible with a second system, and
transmits a second broadcast signal via a second transmission antenna, the second broadcast signal includes a second transmission control signal compatible with the second system and the signal of the second content.

11. A reception device comprising
a reception unit that receives a first broadcast signal transmitted from a transmission device via a first reception antenna,
the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including a signal of the second content and transmits the second broadcast signal via a second transmission antenna.

12. The reception device according to claim 11, further comprising
a first signal processing unit that performs processing including demodulation and decoding of the signal of the first content included in the first broadcast signal received, on a basis of the first transmission control signal included in the first broadcast signal received.

13. The reception device according to claim 11, wherein
the reception unit receives the first broadcast signal via the first reception antenna and receives the second broadcast signal via a second reception antenna, and
a second signal processing unit is further included, the second signal processing unit performing processing including demodulation and decoding of the signals of the second content included in the first broadcast signal and the second broadcast signal received, on a basis of the second transmission control signal included in the second broadcast signal received.

14. The reception device according to claim 11, wherein the first broadcast signal is transmitted as a horizontally polarized wave in a MIMO system, and
the second broadcast signal is transmitted as a vertically polarized wave in the MIMO system.

15. The reception device according to claim 14, wherein the first broadcast signal and the second broadcast signal are subjected to OFDM modulation, and
a position of a carrier that transmits the first transmission control signal in the horizontally polarized wave corresponds to a position of a carrier that transmits the second transmission control signal in the vertically polarized wave.

16. The reception device according to claim 14, wherein the first broadcast signal and the second broadcast signal are subjected to OFDM modulation, and
a position of a carrier that transmits the first transmission control signal in the horizontally polarized wave is different from a position of a carrier that transmits the second transmission control signal in the vertically polarized wave.

17. The reception device according to claim 16, wherein in the vertically polarized wave,
NULL is transmitted by a carrier at a corresponding position corresponding to the position of the carrier that transmits the first transmission control signal in the horizontally polarized wave, and
the second transmission control signal is transmitted by a carrier at a position other than the corresponding position.

18. The reception device according to claim 17, wherein the corresponding position further includes a position corresponding to a position of a carrier that transmits a pilot signal in the horizontally polarized wave.

19. A reception method comprising:
receiving, by a reception device, a broadcast signal transmitted from a transmission device receives a first broadcast signal transmitted from the transmission device via a first reception antenna,
the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in a second broadcast signal including the signal of the second content and transmits the second broadcast signal via a second transmission antenna, and
performing, by the reception device, processing including demodulation and decoding of the signal of the first content included in the first broadcast signal received, on a basis of the first transmission control signal included in the first broadcast signal received.

20. A reception method comprising:
receiving, by a reception device, a broadcast signal transmitted from a transmission device receives a first broadcast signal transmitted from the transmission device via a first reception antenna and receives a second broadcast signal via a second reception antenna,
the transmission device including a transmission unit that includes a first transmission control signal compatible with a first system in the first broadcast signal including a signal of a first content compatible with the first system and a signal of a second content compatible with a second system and transmits the first broadcast signal via a first transmission antenna, and includes a second transmission control signal compatible with the second system in the second broadcast signal including the signal of the second content and transmits the second broadcast signal via a second transmission antenna, and
performing, by the reception device, processing including demodulation and decoding of the signal of the second content included in the first broadcast signal and the second broadcast signal received, on a basis of the second transmission control signal included in the second broadcast signal received.

* * * * *